(12) United States Patent
Banhos et al.

(10) Patent No.: US 10,975,730 B2
(45) Date of Patent: Apr. 13, 2021

(54) DUCT ASSEMBLY FOR A GAS TURBINE ENGINE

(71) Applicant: United Technologies Corporation, Farmington, CT (US)

(72) Inventors: Jonas S. Banhos, Rocky Hill, CT (US); Anthony Prainito, Stamford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 16/460,002

(22) Filed: Jul. 2, 2019

(65) Prior Publication Data

US 2021/0003038 A1    Jan. 7, 2021

(51) Int. Cl.
| | |
|---|---|
| *F02C 7/20* | (2006.01) |
| *F01D 25/28* | (2006.01) |
| *F02K 3/02* | (2006.01) |
| *F02K 3/04* | (2006.01) |

(52) U.S. Cl.
CPC .............. *F01D 25/28* (2013.01); *F02C 7/20* (2013.01); *F02K 3/025* (2013.01); *F02K 3/04* (2013.01)

(58) Field of Classification Search
CPC ........ F01D 25/28; F01D 25/24; F01D 25/243; F02C 7/20; F02K 3/00; F02K 3/02; F02K 3/025; F02K 3/04
See application file for complete search history.

(56) References Cited

U.S. PATENT DOCUMENTS

| | | | | |
|---|---|---|---|---|
| 2,417,025 A | * | 3/1947 | Volpin | F16L 37/113 285/91 |
| 2,466,602 A | * | 4/1949 | Lombard | F02K 1/80 285/261 |
| 2,716,563 A | * | 8/1955 | Seneschall | F16L 27/10 285/364 |
| 8,889,263 B2 | | 11/2014 | Rice | |
| 2004/0007422 A1 | | 1/2004 | Porte | |
| 2012/0219415 A1 | * | 8/2012 | Seize | F02K 1/80 415/214.1 |
| 2013/0227962 A1 | * | 9/2013 | Bunel | F16B 2/14 60/796 |
| 2015/0192140 A1 | | 7/2015 | Derclaye | |
| 2015/0377068 A1 | * | 12/2015 | Eichinger | F23R 3/002 60/796 |
| 2018/0016922 A1 | | 1/2018 | Schiavo | |
| 2018/0017259 A1 | | 1/2018 | Schiavo | |
| 2018/0283212 A1 | | 10/2018 | Wiebe | |

FOREIGN PATENT DOCUMENTS

| | | |
|---|---|---|
| WO | 2012049478 | 4/2012 |
| WO | 2013165505 | 11/2013 |

OTHER PUBLICATIONS

Extended EP Search Report for EP Application No. 20183792.9 dated Sep. 11, 2020.

* cited by examiner

*Primary Examiner* — Steven M Sutherland

(74) *Attorney, Agent, or Firm* — Carlson, Gaskey & Olds, P.C.

(57) ABSTRACT

A gas turbine engine duct assembly includes a composite duct body that includes at least one rim. A flanged bracket includes a radially extending portion that defines a flange. An axially extending portion has an inner duct rim recess for accepting a portion of the at least one rim. At least one attachment plate has a projection recess for accepting a projection on the flanged bracket and an outer rim recess for accepting a portion of the at least one rim.

15 Claims, 4 Drawing Sheets

DUCT ASSEMBLY FOR A GAS TURBINE ENGINE

BACKGROUND

The present invention relates to a duct structure for a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The secondary flow path or bypass flow is typically defined by a duct structure formed from multiple sections attached together. The multiple sections are generally attached to each other through a flanged interface.

SUMMARY

In one exemplary embodiment, a gas turbine engine duct assembly includes a composite duct body that includes at least one rim. A flanged bracket includes a radially extending portion that defines a flange. An axially extending portion has an inner duct rim recess for accepting a portion of the at least one rim. At least one attachment plate has a projection recess for accepting a projection on the flanged bracket and an outer rim recess for accepting a portion of the at least one rim.

In a further embodiment of the above, the projection includes a first axially facing projection surface that extends in a first plane perpendicular to a central longitudinal axis of the flanged bracket. A second axially facing projection surface extends in a second plane perpendicular to the central longitudinal axis of the flanged bracket.

In a further embodiment of any of the above, the projection recess includes a first axially facing recess surface in abutting contact with the first axially facing projection surface. A second axially facing recess surface is in abutting contact with the second axially facing projection surface.

In a further embodiment of any of the above, the projection includes a radially outward facing projection surface that has a constant radial dimension between the first axially facing projection surface and the second axially facing projection surface.

In a further embodiment of any of the above, an inner surface of the composite duct body at least partially defines a bypass flow path.

In a further embodiment of any of the above, the at least one rim includes a larger cross section than a body portion of the composite duct body.

In a further embodiment of any of the above, the at least one rim includes a cross section that has a diameter greater than a thickness of a body portion of the composite duct body.

In a further embodiment of any of the above, the projection forms a continuous circumferential lip surrounding a perimeter of a radially outer surface of the axially extending portion.

In a further embodiment of any of the above, the at least one rim includes a plurality of structural layers and shaping material surrounding by continuous outer fibers.

In another exemplary embodiment, an attachment device for a bypass duct in a gas turbine engine includes a flanged bracket that includes a radially extending portion at least partially defining a flange. An axially extending portion extends from a radially inner edge of the radially extending portion and has a duct recess for accepting a portion of a duct. A projection extends radially outward from a radially outer surface of the axially extending portion.

In a further embodiment of any of the above, at least one attachment plate includes a projection recess for accepting the projection. The at least one attachment plate is axially offset from the radially extending portion.

In a further embodiment of any of the above, a fastener opening extends through the projection recess and is aligned with a fastener opening in the projection.

In a further embodiment of any of the above, a fastener extends through the fastener opening in the bracket recess and the fastener opening in the projection.

In a further embodiment of any of the above, the at least one attachment plate includes an outer duct recess for accepting a portion of the rim of the duct. The outer duct recess is at least partially axially aligned with the inner duct recess.

In a further embodiment of any of the above, the projection includes a first axially facing projection surface that extends in a first plane perpendicular to a central longitudinal axis of the flanged bracket. A second axially facing projection surface extends in a second plane perpendicular to the central longitudinal axis of the flanged bracket.

In a further embodiment of any of the above, the projection recess includes a first axially facing recess surface in abutting contact with the first axially facing projection surface. A second axially facing recess surface is in abutting contact with the second axially facing projection surface.

In another exemplary embodiment, a method of assembling a gas turbine engine duct includes the step of locating a first portion of a rim of a composite duct in an inner rim recess on an axially extending portion of a flanged bracket. At least one attachment plate adjacent the axially extending portion is located. The at least one attachment plate includes an outer rim recess for accepting a second portion of the rim and a projection recess for accepting a projection extending radially outward from the axially extending portion.

In a further embodiment of any of the above, the method includes locating at least one fastener through the projection recess on the at least one attachment plate and the projection on the flanged bracket.

In a further embodiment of any of the above, the projection includes a first axially facing projection surface that extends in a first plane perpendicular to a central longitudinal axis of the flanged bracket. A second axially facing projection surface extends in a second plane perpendicular to the central longitudinal axis of the flanged bracket.

In a further embodiment of any of the above, the projection recess includes a first axially facing recess surface in abutting contact with the first axially facing projection surface. A second axially facing recess surface is in abutting contact with the second axially facing projection surface.

DETAILED DESCRIPTION

Figure 1:
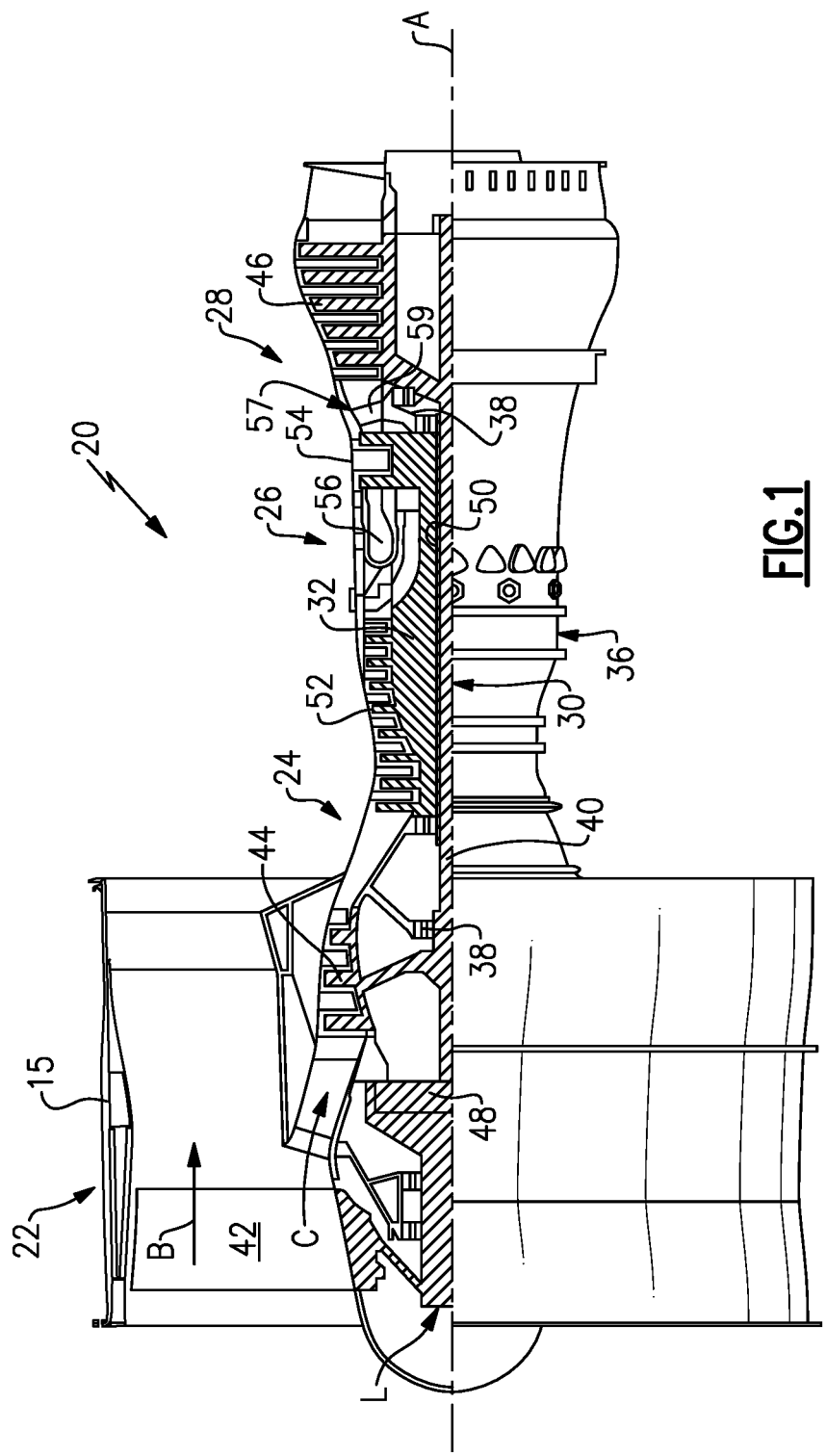
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° \ R)/(518.7° \ R)]^{0.5}$. The "Low corrected fan tip speed" as disclosed herein according to one non-limiting embodiment is less than about 1150 ft/second (350.5 meters/second).

Figure 2:
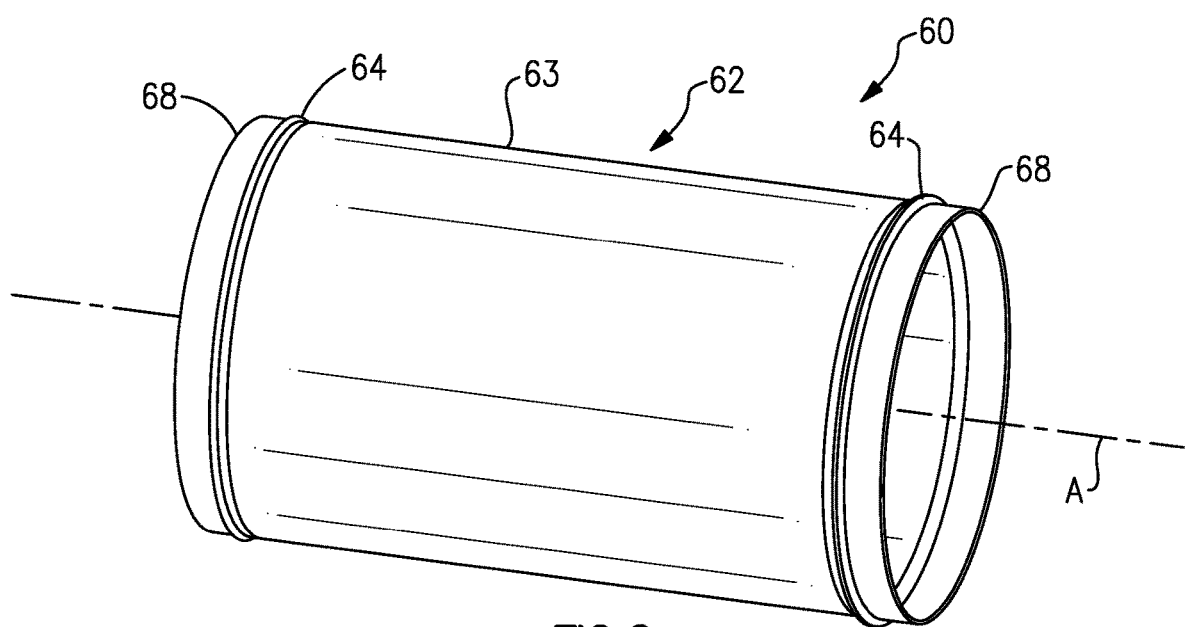
FIG. 2 is a perspective view of an example duct assembly.

FIG. 2 illustrates an example duct assembly 60. The duct assembly 60 includes a composite duct 62, metallic flanged brackets 64, and attachment plates 66 surrounding the composite duct 62 and the flanged brackets 64. The duct assembly 60 is attachable to mating ducts 68 at opposing axial ends of the duct assembly 60 with a corresponding one of the metallic flanged brackets 64. The composite duct 62, the flanged brackets 64, and the mating ducts 68 extend about a longitudinal axis common with the engine axis A. In the illustrated example, the composite duct 62 is made of a fiber reinforced material and the mating duct 68 is made of a metallic material. In this disclosure, radial or radially and axial or axially is in relation to the engine axis A unless stated otherwise.

Figure 3:
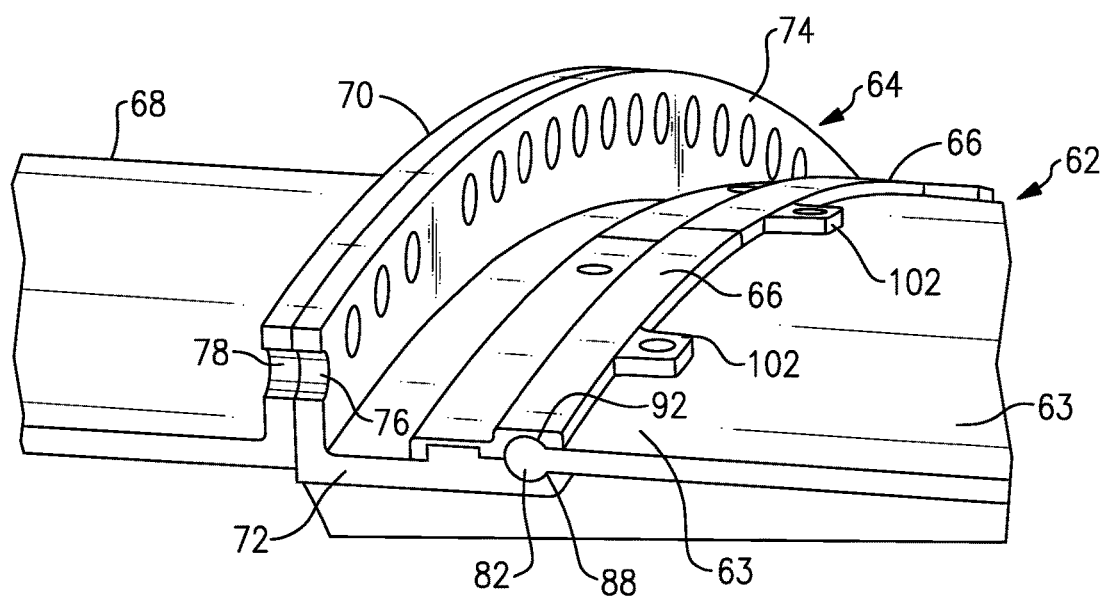
FIG. 3 is an enlarged view of a flanged connection on the example duct assembly of FIG. 2.

As shown in FIG. 3, the flanged bracket 64 includes an axially extending portion 72 that engages the composite duct 62 and a radially extending portion 74 that engages a mating duct flange 70 on the mating duct 68. The axially extending portion 72 extends axially from a radially inner edge of the radially extending portion 74 to the composite duct 62. The mating duct flange 70 on the mating duct 68 is secured to the radially extending portion 74 on the flanged bracket 64 with fasteners (not shown). The fasteners extend through mating duct flange fastener openings 78 in the mating duct flange 70 and a corresponding flanged bracket fastener opening 76 on the radially extending portion 74.

Figure 5:
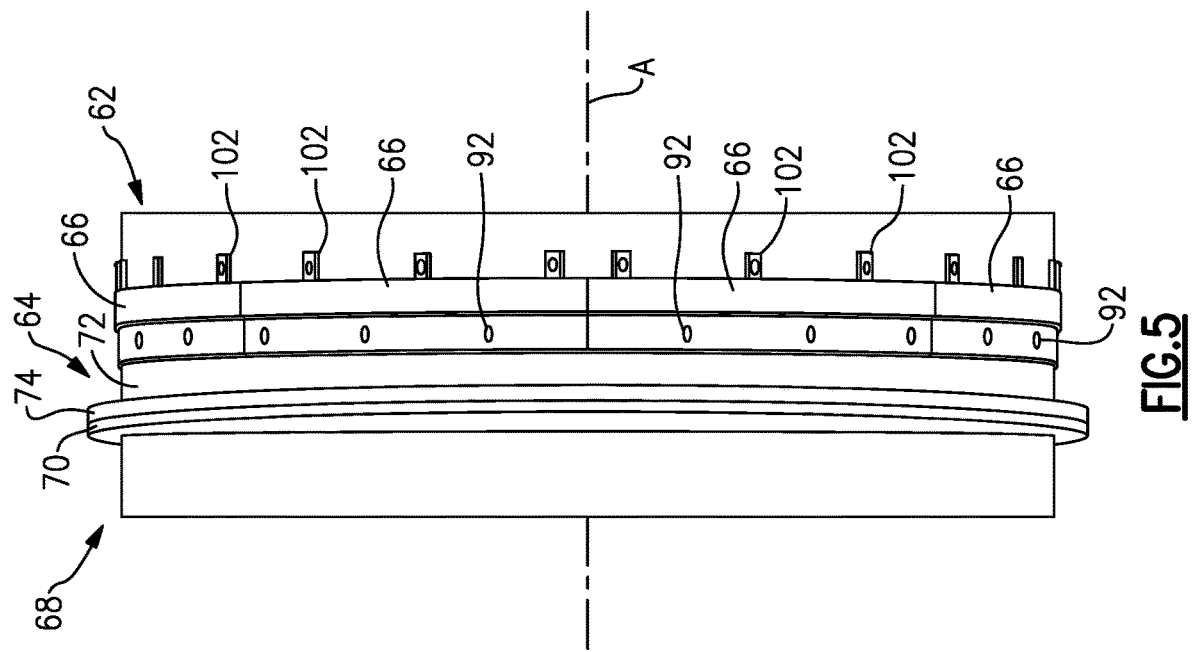
FIG. 5 is a side view of the example duct assembly.

The composite duct 62 is secured relative to the mating duct 68 through a combination of the flanged bracket 64 and the attachment plates 66. In the illustrated example, the composite duct 62 includes a rim 82 on at least one of the axial ends of the composite duct 62. The attachment plates 66 and the flanged bracket 64 surround the rim 82 on opposing radial sides to prevent the rim 82 from moving axially relative to the flange bracket 64 and the attachment plates 66. The larger width of the rim 82 compared to a body portion 63 of the composite duct 62 contributes to securing the composite duct 62 to the flanged bracket 64 and the attachment plates 66. As shown in FIGS. 3 and 5, multiple individual attachment plates 66 are positioned relative to the flanged bracket 64 and the composite duct 62 with each of the individual attachment plates 66 forming an arched segment that when joined together surround a circumference of the composite duct 62.

Figure 4:
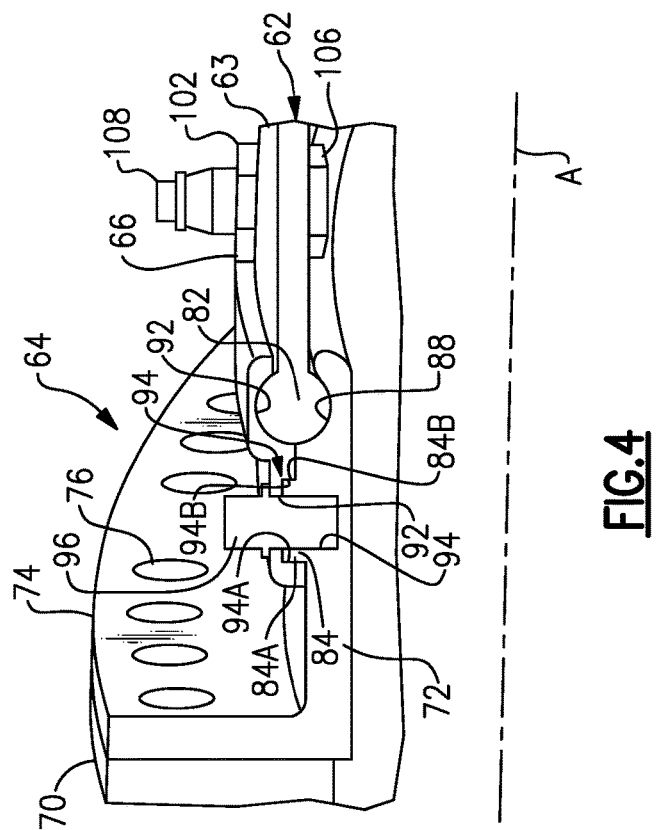
FIG. 4 is a cross-sectional view of a fastener through the flanged connection.

As shown in FIGS. 3 and 4, the flanged bracket 64 includes an inner rim recess 88 for accepting a portion of the rim 82 on the composite duct 62. The inner rim recess 88 that generally follows a profile of the rim 82 along a radially inner side of the composite duct 62. Similarly, each of the attachment plates 66 include an outer rim recess 92 that generally follows the profile of the rim 82 along a radially outer side of the composite duct 62. Although the rim 82 is shown in the illustrated example having a circular cross-sectional shape, other cross-sectional shapes could be used for the rim 82, such as a dove-tailed or triangular cross-sectional shape. In particular, a feature of the rim 82 is to have a larger cross-sectional width than the body portion 63 to provide a structure for the inner rim recess 88 and the outer ring recess 92 to engage. When the attachment plates 66 are secured to the flanged bracket 64, the composite duct 62 is at least partially secured relative to the flanged bracket 64.

As shown in FIGS. 3 through 5, the attachment plate 66 and flanged bracket 64 are further secured to each other with a first set of fasteners 108 and a second set of fasteners 96. Each of the attachment plates 66 include axially extending projections 102 that extend along the body portion 63 of the composite duct 62 and away from the rim 82. The flanged bracket 64 also includes multiple axially extending projections 106 aligned with a corresponding one of the axially extending projections 102 on the attachment plates 66. Fasteners 108 (FIG. 5) extend through the axially extending projections 102 on the attachment plate 66 and the corresponding one of the axially extending projections 106 on the flanged bracket 64 to further secure the composite body 62 relative to the flange bracket 64 and the attachment plates 66. The fasteners 108 also compress the attachment plate 66 relative to the flanged bracket 64.

The flanged bracket 64 is further secured to the attachment plate 66 through the use of a projection 84 on the flanged bracket 64 that mates with a corresponding projection recess 94 on the attachment plate 66. The projection 84 forms a continuous circumferential lip surrounding a radially outer surface of the axially extending portion 72 of the flanged bracket 64. Additionally, the second set of fasteners 96 extend through fastener openings 92 aligned with the projection recess 94 on the attachment plate 66 and fastener openings 94 aligned with the projection 84 on the radially extending portion 74 of the flanged bracket 64.

In the illustrated example, the projection 84 includes a first axially facing projection surface 84A and second axially facing projection surface 84B that face in opposite axial directions from each other. The first axially facing projection surface 84A extends in a first plane generally perpendicular to the central longitudinal axis A of the flanged bracket 64 and the gas turbine engine 20. The second axially facing projection surface 84B extends in a second plane perpendicular to the central longitudinal axis A of the flanged bracket 64 and the gas turbine engine 20. In the illustrated example, the first plane of the first axially facing projection surface 84A and the second plane of the second axially facing projection surface 84B are generally parallel to each other.

Similarly, the projection recess 94 on the attachment plate 66 includes a first axially facing recessed surface 94A and a second axially facing recessed surface 94B. In the illustrated example, the first axially facing recessed surface 94A is in abutting contact with the first axially facing projection surface 84A and the second axially facing recessed surface 94B is in abutting contact with the second axially facing projection surface 84B. The first and second axially facing projection surfaces 84A and 84B are generally perpendicular to the axis A to reduce shear forces in fasteners 96 used to secure the attachment plate 66 to the flanged bracket 64. In particular, the perpendicular arrangement of the first and second axially facing projection surfaces 84A, 84B with the first and second axially facing recessed surfaces 94A, 94B reduces or eliminates the shear forces on the first set of fasteners 96 that secure the attachment plate 66 to the flanged bracket 64.

Additionally, by having the first and second axially facing projection surfaces 84A, 84B and the first and second axially facing recessed surfaces 94A, 94B generally perpendicular to the axis A, axial forces between the attachment plate 66 and the flanged bracket 64 will reduce shear loads in fasteners 96 given the duct's 62 axial tension/compression that would result if the surfaces 84A, 84B, 84A, 94B were slanted and not perpendicular to the axis A. One feature of this arrangement is to reduce a size of the fasteners 96 that are needed to secure the attachment plate 66 relative to the flanged bracket 64 by reducing the load carried by the fasteners 96. The reduced size of the fasteners reduces the weight of the assembly.

Figure 6:
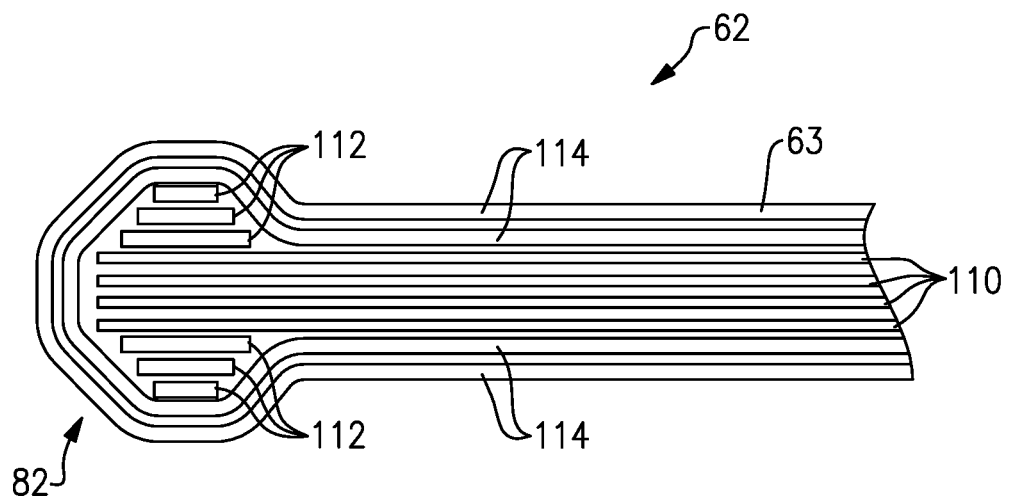
FIG. 6 is a cross-sectional view of an example rim and body portion of a composite duct.
Figure 7:
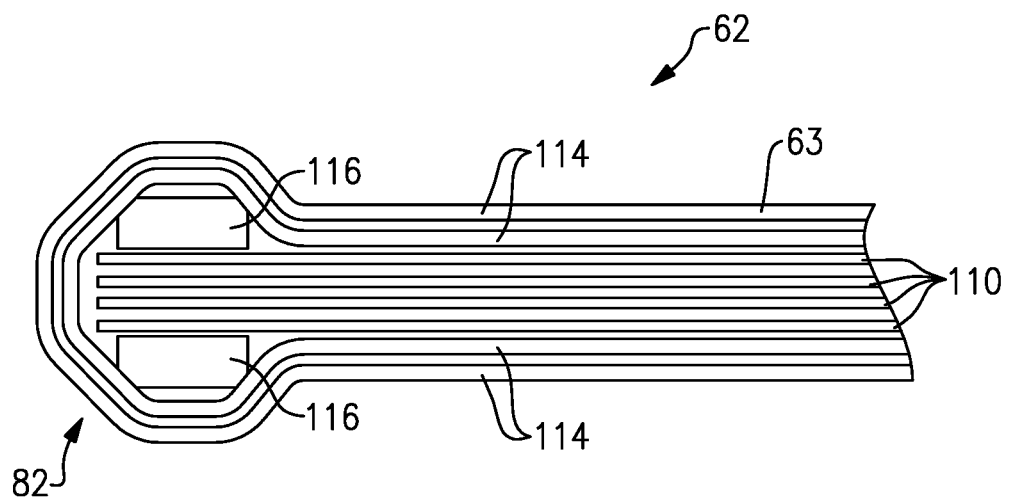
FIG. 7 is a cross-sectional view of another example rim and body portion of a composite duct.

As shown in FIGS. 6 and 7, the rim 82 on the composite duct 62 can be formed using multiple approaches. In one example, the rim 82 can be formed by stacking multiple stacking fibers 112 on a plurality of structural layers 110 (FIG. 6). The structural layers 110 include ends that terminate at a distal end of the composite duct 62. The stacking fibers 112 are stacked on both a radially inner side and a radially outer side of the structural fibers 110. The structural fibers 110 and the stacking fibers 112 are then wrapped in continuous outer fibers 114 that surround an exterior surface of the composite duct 62 that include distal ends spaced from the rim 82. Similarly, the rim 82 can be formed using structural elements 116, such as rolled fiber tape foam or other solid that could provide compressive support, in place of the stacking fibers 112.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine duct assembly comprising:
a composite duct body including at least one rim;
a flanged bracket includes a radially extending portion defining a flange and an axially extending portion having an inner duct rim recess for accepting a portion of the at least one rim; and
at least one attachment plate having a projection recess for accepting a projection on the flanged bracket and an outer rim recess for accepting a portion of the at least one rim, wherein the projection includes a first axially facing projection surface extending in a first plane perpendicular to a central longitudinal axis of the flanged bracket and a second axially facing projection surface extending in a second plane perpendicular to the central longitudinal axis of the flanged bracket and the projection includes a first axially facing projection surface extending in a first plane perpendicular to a central longitudinal axis of the flanged bracket and a second axially facing projection surface extending in a second plane perpendicular to the central longitudinal axis of the flanged bracket.

2. The assembly of claim 1, wherein the projection includes a radially outward facing projection surface having a constant radial dimension between the first axially facing projection surface and the second axially facing projection surface.

3. The assembly of claim 1, wherein an inner surface of the composite duct body at least partially defines a bypass flow path.

4. The assembly of claim 1, wherein the at least one rim includes a larger cross section than a body portion of the composite duct body.

5. The assembly of claim 1, wherein the at least one rim includes a cross section having a diameter greater than a thickness of a body portion of the composite duct body.

6. The assembly of claim 1, wherein the projection forms a continuous circumferential lip surrounding a perimeter of a radially outer surface of the axially extending portion.

7. The assembly of claim 1, wherein the at least one rim includes a plurality of structural layers and shaping material surrounding by continuous outer fibers.

8. An attachment device for a bypass duct in a gas turbine engine comprising:
a flanged bracket including
a radially extending portion at least partially defining a flange;
an axially extending portion extending from a radially inner edge of the radially extending portion having a duct recess for accepting a portion of a duct and a projection extending radially outward from a radially outer surface of the axially extending portion; and
at least one attachment plate including a projection recess for accepting the projection, the at least one attachment plate is axially offset from the radially extending portion, and a fastener opening extends through the projection recess and is aligned with a fastener opening in the projection.

9. The device of claim 8, further comprising a fastener extending through the fastener opening in the bracket recess and the fastener opening in the projection.

10. The device of claim 8, wherein the at least one attachment plate includes an outer duct recess for accepting a portion of the rim of the duct and the outer duct recess is at least partially axially aligned with the inner duct recess.

11. The device of claim 8, wherein the projection includes a first axially facing projection surface extending in a first plane perpendicular to a central longitudinal axis of the flanged bracket and a second axially facing projection surface extending in a second plane perpendicular to the central longitudinal axis of the flanged bracket.

12. The device of claim 11, wherein the projection recess includes a first axially facing recess surface in abutting contact with the first axially facing projection surface and a second axially facing recess surface in abutting contact with the second axially facing projection surface.

13. A method of assembling a gas turbine engine duct comprising the steps of:
locating a first portion of a rim of a composite duct in an inner rim recess on an axially extending portion of a flanged bracket; and
locating at least one attachment plate adjacent the axially extending portion, wherein the at least one attachment plate includes an outer rim recess for accepting a second portion of the rim and a projection recess for accepting a projection extending radially outward from the axially extending portion; and
locating at least one fastener through the projection recess on the at least one attachment plate and the projection on the flanged bracket.

14. The method of claim 13, wherein the projection includes a first axially facing projection surface extending in a first plane perpendicular to a central longitudinal axis of the flanged bracket and a second axially facing projection surface extending in a second plane perpendicular to the central longitudinal axis of the flanged bracket.

15. The method of claim 13, wherein the projection recess includes a first axially facing recess surface in abutting contact with the first axially facing projection surface and a second axially facing recess surface in abutting contact with the second axially facing projection surface.

* * * * *